E. FALKENTHAL.
APPARATUS FOR TRANSFORMING ELECTRIC CURRENTS.
APPLICATION FILED AUG. 12, 1912.
1,181,216.
Patented May 2, 1916.
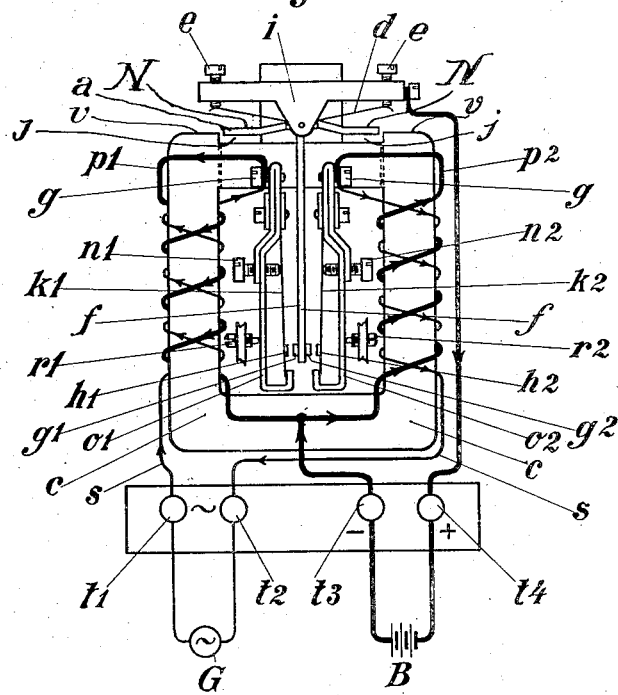
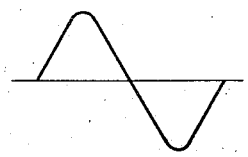
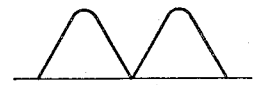
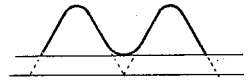
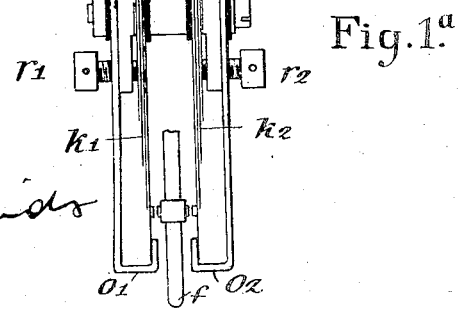
Witnesses
Inventor

UNITED STATES PATENT OFFICE.

ERWIN FALKENTHAL, OF FRIEDENAU, NEAR BERLIN, GERMANY.

APPARATUS FOR TRANSFORMING ELECTRIC CURRENTS.

1,181,216.  Specification of Letters Patent.  Patented May 2, 1916.

Application filed August 12, 1912. Serial No. 714,742.

*To all whom it may concern:*

Be it known that I, ERWIN FALKENTHAL, an engineer, and subject of the German Emperor, residing at Friedenau, near Berlin, Germany, have invented a certain new and useful Improvement in Apparatus for Transforming Electric Currents, of which the following is a full, clear, concise, and exact description, reference being had to the accompanying drawing, forming a part of this specification.

My invention relates to an apparatus for transforming electric currents, and particularly to an apparatus adapted to transform an alternating current into a pulsating direct current or for transforming a direct current into an alternating current. Therefore the apparatus can be used, in the first case, to apply the loading current for a battery from an alternating current generator, whereas in the second case the apparatus can serve, for instance in telephone systems, to deliver the ringing current from the central battery located at the exchange.

The object of my invention is to produce an instrument with a high efficiency performing the transformation of a current of the one kind into a current of the other kind with a very small loss. For this purpose the windings serving to conduct and to generate the different kinds of currents are coiled, like the windings of the well-known transformers, around a common iron core, nearly or entirely closed and made of sheet-metal. Furthermore the apparatus is so arranged, that the common iron core at the same time and with a minimum of energy serves to operate the contact- or switching device of the apparatus, the armature operating said device and having poles of the same polarity at its ends being arranged in a stray-flux of the core, so that it is vibrated through the fluctuations or reversals of said stray-flux. By these arrangements it is accomplished that the apparatus herein described when transforming an alternating current into a direct current or vice versa has an efficiency which is nearly or entirely the same as the high efficiency of the well-known apparatus serving to transform an alternating current of a low voltage into an alternating current of a high voltage or vice versa.

A further important feature of my invention consists in suitable regulating means in combination with the contact- or switching device of the apparatus which means are adapted to raise the efficiency of the apparatus to a high value. These regulating means are arranged to damp or suppress irregular and therefore disadvantageous self-oscillations of the moved parts of the switching device, so that the wave of the generated current becomes a most favorable one.

Another feature of my invention relates to regulating means by means of which, when an alternating current is transformed into a pulsating direct current for the purpose of loading an accumulator, only those parts of the waves of the pulsating direct current are delivered the E. M. F. of which is higher than the counter-E. M. F. of the battery to be loaded.

I will explain my invention more fully by reference to the accompanying drawings in which—

Figure 1 is a diagrammatical view of my apparatus; Fig. 1ª is a fragmentary view of a portion of my apparatus; and Figs. 2 to 4 illustrate the changes in wave form of the current produced by my apparatus.

Referring to Fig. 1 $c$ denotes an iron core made of sheet metal before which a polarized armature $a$ is arranged to be vibrated. The core $c$ is preferably provided with prominent parts, $v$ forming the pole pieces of the apparatus, so that the core $c$ is provided with suitable lateral gaps or air spaces $j$ which are so arranged that the ends of the armature $a$ are lying in the stray-flux of magnetism generated at said gaps.

The armature $a$ is polarized in such a manner that at its ends are poles of the same polarity. This polarizing may be effected by any one of the means well known to those skilled in the art.

The armature $a$ is pivoted at a frame or support $i$ and is provided with a damping spring $d$ the ends of which are pressed with a certain pressure against pins $e$, which advantageously are fastened to the support $i$ and have the form of screws. In order that the frictional contact between the pins $e$ and the ends of the spring $d$ may be always the same, the pins and the spring are made advantageously of different metals. The spring $d$ and the support $i$ may serve at the same time to conduct the electric current.

The armature $a$ is further provided with a pendant $f$ which at its end carries contacts $g^1$, $g^2$. Opposite to these contacts $g^1$, $g^2$ are arranged contacts $h^1$, $h^2$, so that when the pendant $f$ oscillates in the one direction the contact $g^1$, $h^1$ is closed, whereas when the pendant oscillates in the other direction the contact $g^2$, $h^2$ is closed. The contacts $h^1$, $h^2$ are at the ends of springs $k^1$, $k^2$ which are suitably fastened to the frame of the apparatus or to the iron core $c$. Each spring $k^1$, $k^2$ consists of a plurality of springs the length of which is advantageously different, as shown in Fig. 1$^a$. These springs are arranged one above the other in such a manner that when oscillating they are moved against each other under a certain pressure, whereby a damping of the oscillating system is secured.

In order to alter the period of oscillation of the spring systems $k^1$, $k^2$ and to make this period of oscillation equal to the period of the alternating current to be transformed, regulating screws $n^1$, $n^2$ are provided which are adapted to alter the pressure or friction between the different springs of the spring system $k^1$ and $k^2$. The free ends of the longest springs $k^1$, $k^2$ strike against projections of stops $o^1$, $o^2$ which by means of regulating screws $r^1$, $r^2$ can be adjusted in such a way, that the distance between the contacts $h^1$, $h^2$ and thereby the interval between closing the contacts $g^1$, $h^1$ and $g^2$, $h^2$ may be altered. Advantageously the spring systems $k^1$, $k^2$ and the regulating screws $n^1$, $n^2$ are fastened to said stops $o^1$, $o^2$.

Around the iron core $c$ a secondary winding $s$ and two primary windings $p^1$, $p^2$ are coiled. The two primary windings $p^1$, $p^2$ are connected at the middle with the terminal $t^3$ leading to the one pole of a source of direct current B. The free ends of the windings $p^1$, $p^2$ are connected with the springs $k^1$ and $k^2$. The terminal $t^4$ which leads to the other pole of the source of direct current is connected to the pendant $f$ and the contacts $g^1$, $g^2$ of this pendant.

The secondary winding $s$ is preferably, as shown, electrically connected with the primary windings whereby in a well known manner a higher efficiency is secured.

The operation of the apparatus when serving to transform an alternating current into a pulsating current is as follows: An alternating current delivered from a generator G over the terminals $t^1$. $t^2$ to the secondary winding $s$ flows through this winding and the primary windings $p^1$, $p^2$, in series. That current having a wave shown by Fig. 2 sets up an alternating flux in the core $c$ and this alternating flux induces in well known manner each of the primary windings $p^1$, $p^2$. The alternating magnetization of the core $c$ further sets the armature $a$ in oscillation so that in the first half of the period or cycle of the alternating current the pendant $f$ of the armature $a$ holds closed, for instance, the contact $g^1$, $h^1$ whereas in the second half of the cycle the pendant holds closed the contact $g^2$, $h^2$, the switching of the contacts taking place each time when the E. M. F. of the alternating current changes the sign. Owing to the connection above mentioned of the primary windings $p^1$, $p^2$ at the terminals $t^3$, $t^4$, a varying E. M. F. is set up which however never changes sign. Therefore a direct current is obtained which is not perfectly constant, but pulsating and having about the wave shown by Fig. 3. This wave form represents the most favorable case of transformation. But as the oscillating parts of the apparatus herebefore known had the tendency to make irregular oscillations and as by this reason the switching of the contacts did not occur in the right moment, the wave of the obtained pulsating current practically was not so favorable as shown by Fig. 3, but it was distorted or displaced, whereby the efficiency of the apparatus was decreased. By the damping and regulating means described above however the operation of the apparatus is perfected to such a degree that the wave form shown by Fig 3 can be exactly obtained.

If alternating current is to be transformed in order to load accumulators which have a certain counter E. M. F. it is disadvantageous to generate a pulsating current of the wave form shown by Fig. 3, but it is advisable or even necessary, only to use the wave-parts lying above the constant counter-E. M. F., as shown by Fig. 4. In order to obtain a pulsating current of such a wave-form, it is sufficient to adjust in a suitable extent the stops $o^1$, $o^2$ by means of the screws $r^1$, $r^2$.

It is obvious that the described apparatus can be also used for transforming a constant direct current into an alternating current.

I do not limit myself to the embodiment of the invention herein specifically illustrated as many changes may be made without departing from the spirit of my invention.

Having thus fully described my invention, what I claim as new, and desire to secure by Letters-Patent is:—

1. Apparatus for transforming electric currents comprising an iron core, an alternating current winding around the core, a direct current winding around the core, an armature with poles of the same polarity at its ends and oscillating in the stray flux of said core, contacts at each end of said direct current winding, a contact member connected to said armature adapted to contact with said contacts alternately, direct current connections to said contact member and to the mid point of said direct current winding, and means for damping irregular oscillations of the armature and its associated parts.

2. Apparatus for transforming electric currents comprising an iron core, prominent parts forming the pole pieces of the core, an alternating current winding around the core, a direct current winding around the core, an armature with poles of the same polarity at its ends and oscillating in the stray flux of said core dispersed from said pole pieces, contacts at each end of said direct current winding, a contact member connected to said armature adapted to contact with said contacts alternately, direct current connections to said contact member and to the mid point of said direct current winding, and means for damping irregular oscillations of the armature and its associated parts.

3. Apparatus for transforming electric currents comprising an iron core provided with gaps or air spaces, an alternating current winding around the core, a direct current winding around the core, an armature with poles of the same polarity at its ends and oscillating in the stray flux dispersed from the gaps of the core, contacts at each end of said direct current winding, a contact member connected to said armature adapted to contact with said contacts alternately, direct current connections to said contact member and to the mid point of said direct current winding and means for damping irregular oscillations of the armature and its associated parts.

4. Apparatus for transforming electric currents comprising an iron core, an alternating current winding around the core, a direct current winding around the core, an armature with poles of the same polarity at its ends and oscillating in the stray flux of said core, contacts at each end of said direct current winding, a contact member connected to said armature adapted to contact with said contacts alternately, direct current connections to said contact member and to the mid point of said direct current winding and damping means in part attached to the armature and adapted to permanently coöperate therewith and in part attached to the frame and adapted to be periodically operated by the armature.

5. Apparatus for transforming electric currents comprising an iron core, a winding coiled around said core, another winding on the core, an armature with poles of the same polarity at its ends oscillating in a stray-flux of the core, contacts adapted to be operated by the armature, said contacts consisting each of a plurality of springs lying one above the other.

6. Apparatus for transforming electric currents comprising an iron core, a winding coiled around said core, another winding on the core, an armature with poles of the same polarity at its ends oscillating in a stray-flux of the core, contacts adapted to be operated by the armature, said contacts consisting each of a plurality of springs of different length lying one above the other, and means for regulating the pressure between the different springs.

7. Apparatus for transforming electric currents comprising an iron core, a winding coiled around said core, another winding on the core, an armature with poles of the same polarity at its ends oscillating in a stray-flux of the core, contact springs adapted to be operated by the armature, stops for limiting the movement of said contact springs, means for regulating said stops.

E. FALKENTHAL.

Witnesses:
 WOLDEMAR HAUPT,
 HENRY HASPER.